April 28, 1970 TAKEO KAMEGAYA 3,509,409
PLURAL SECTION ELECTRODE FOR COLD CATHODE ELECTRIC DISCHARGE TUBE
Filed Sept. 19, 1967 6 Sheets-Sheet 1

INVENTOR
TAKEO KAMEGAYA

BY

ATTORNEYS

April 28, 1970    TAKEO KAMEGAYA    3,509,409
PLURAL SECTION ELECTRODE FOR COLD CATHODE ELECTRIC DISCHARGE TUBE
Filed Sept. 19, 1967    6 Sheets-Sheet 5

INVENTOR
TAKEO KAMEGAYA

BY

ATTORNEYS

FIG-16

# United States Patent Office 3,509,409
Patented Apr. 28, 1970

3,509,409
PLURAL SECTION ELECTRODE FOR COLD CATHODE ELECTRIC DISCHARGE TUBE
Takeo Kamegaya, Tokyo, Japan, assignor to Japan Broadcasting Corporation, Tokyo, Japan
Filed Sept. 19, 1967, Ser. No. 668,854
Claims priority, application Japan, Sept. 29, 1966, 41/63,164
Int. Cl. H01j *17/04, 61/04*
U.S. Cl. 313—205                    16 Claims

ABSTRACT OF THE DISCLOSURE

An electrode for use in a cold cathode discharge tube and which provides excellent suppression of random and periodic noises, which tend to irradiate from the inside of the tube. The main electrode comprises a substantially closed structure having an opening therein to produce an electron flow to the opposite electrode. An additional electrode is provided inside the main electrode forming a partition in the direction of the opening and is connected electrically to the main electrode.

BACKGROUND OF THE INVENTION

Recently the use of neon lamps for Neon sign displays has become more and more popular. The popularity of the use of the neon lamps has not been limited only to the large cities, but their use has spread among middle or small size towns all over the country. Such increased use of neon lamps has affected radio and television broadcasting. In spite of the efforts of the broadcasters, such as increasing the transmitting power, much interference may increasing the transmitter power, much interference may be observed in the reception of radio and television broadcasts caused by high frequency noises emanated from various cold cathode discharge tubes, and more particularly from neon lamps.

Heretofore various methods have been considered for preventing the influence of such noises. For preventing so-called "conductive noises," which are emanated via the electric supply wires for these tubes, a method using certain types of circuit elements, such as capacitors, is usually applied. For preventing noise directly emanating from the lamp to the outside, a method of shielding the neon lamp by a wire gauze has usually been applied. However both of the aforementioned methods have drawbacks in that the former method may result in fluctuation in a high frequency range and the latter method is costly and, moreover, the illumination effect may be spoiled. Therefore the prevention of the emanation of such noises has not been popularly practiced.

Judging from aforementioned situation, it is believed that the most important concern in preventing noises from emanating from neon lamps is not to suppress the emanated noises, but to develop novel discharge tubes which generate substantially no noise from the electrode construction of the tube itself. The present inventor conducted extensive research into the cause of the generation of the noise and studied methods of preventing the original production of the noises. The inventor succeeded in obtaining a novel lamp structure which is able to substantially perfectly suppress noise while still having brightness and discharge characteristics at least equivalent to the conventional discharge tubes.

SUMMARY OF THE INVENTION

The present invention relates to an electrode for a cold cathode discharge tube and more particularly to a novel electrode construction suitable to prevent the emanation of noises from neon lamps used in Neon display signs.

The present invention has for its object to obtain an electrode suitable to eliminate the cause of generation of noises inherent to such discharge tubes.

Another object of the invention is to provide a noiseless electric discharge tube, more particularly a neon discharge tube, which is able to prevent the emanation of noise from the electrode portion of the tube itself without any use of the preventing means conventionally required for preventing emission of such noise from the tube.

A further object of the present invention is to obtain a novel electrode structure for use in such a discharge tube as mentioned above, which has a very simple construction and is easily manufactured with a very low cost.

An important feature of the present invention is that that electrode comprises a main electrode having conical or cylindrical form with a discharge opening and an additional electrode provided on the inside of the main electrode where the negative glow is generated. The additional electrode may have various configurations such as a tubular shape or plate shape. The additional electrode is effective to help to enlarge the effective area of the operating surface of the cathode and to prevent leakage and overflow of the negative glow, which is the main cause of the emanation of noise, and thus to maintain the operational discharge as a normal glow condition.

The present invention has as another feature to make the end portion of the opening edge of the main electrode a round shape, more particularly, to make the radius of the outer circumferential curvature of the round edge portion of the main electrode at least 0.3 mm. in order to suppress not only aforementioned noise, but to suppress the anode noise to thereby obtain a more perfect noiseless cold cathode discharge tube.

BRIEF DESCRIPTION OF DRAWINGS

The means for accomplishing the foregoing objects and other advantages, which will be apparent to those skilled in the art, are set forth in the following specification and claims, and are illustrated in the accompanying drawings dealing with several embodiments of the present invention. Reference is made now to the drawings in which:

FIGS. 10(*a*) and (*b*) show an embodiment of one end portion of a neon discharge tube and the electrode construction according to the invention in partial longitudinal and transverse sectional views, respectively;

In order to better understand the electrode of the invention, the nature of noise emanated from a neon lamp, as a typical cold cathode discharge tube, will be explained.

Usually the discharge tube used in Neon display signs is a cold cathode discharge tube filled with gaseous mixture of mercury and argon or neon. This kind of discharge tube produces various kinds of noises during the discharge operation, namely electric oscillations of a random nature and a periodic nature are generated and emanated from the tube. As is well known, such noises greatly adversely affect television and radio broadcasting and radio communications.

The cause of generation of such noises can be analyzed by the following consideration. One kind of noise is a periodic noise, which is emanated during the period of increase of the discharging current when the electrode is operating as the cathode of the neon discharge tube. Another kind of noise is also periodically produced when a concentrated glow is produced at a side portion of the electrode. Another kind of the noise is anodic noise produced at the time of transient voltage oscillation when the electrode is operating as the anode of the neon lamp.

Figure 1:
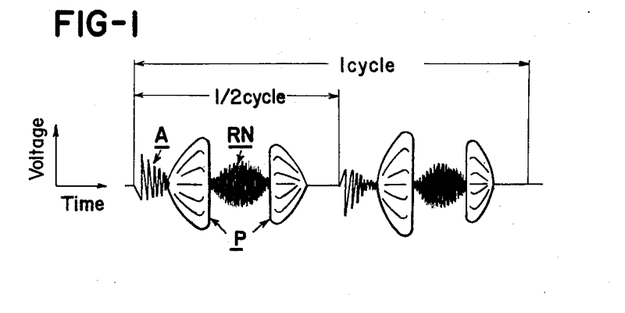
FIG. 1 shows diagrammatically the wave form of the noise voltage produced at the cathode and anode portions of a neon lamp when the lamp is energized by a 50–60 c.p.s. A.C. supply source.

FIG. 1 shows schematically a wave form of noise voltage of a neon discharge tube of the conventional type. The wave form shows the source voltage when a neon lamp is operated by a 50–60 c.p.s. A.C. voltage source having the low frequency component thereof eliminated by passing through a differential circuit comprising C and R elements. In the figure, portion A is a wave form of a kind of anode noise produced, when the electrode is operating as an anode of the neon lamp, in accordance with the transient source voltage oscillation caused by an inductance, distributing capacity and the stray ground capacity of the winding of the power transformer, and the stray ground capacity of the tube valve.

Portion RN is a wave form of random noise generated, when the electrode is operating as a cathode of the tube, during the increasing period of the current. Portion P is a wave form of periodic noise caused, when the electrode is operating as a cathode of the lamp, by concentrated negative glow at the electrode.

Figure 2:
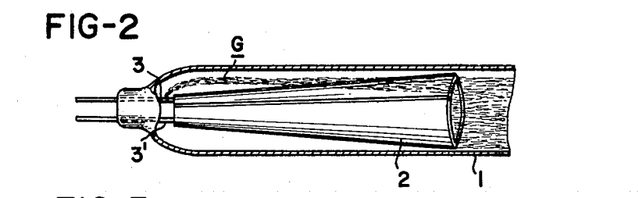
FIG. 2 shows a schematic section of the electrode portion of a neon lamp of the conventional type when random cathode noise is generating therefrom.
Figure 3:
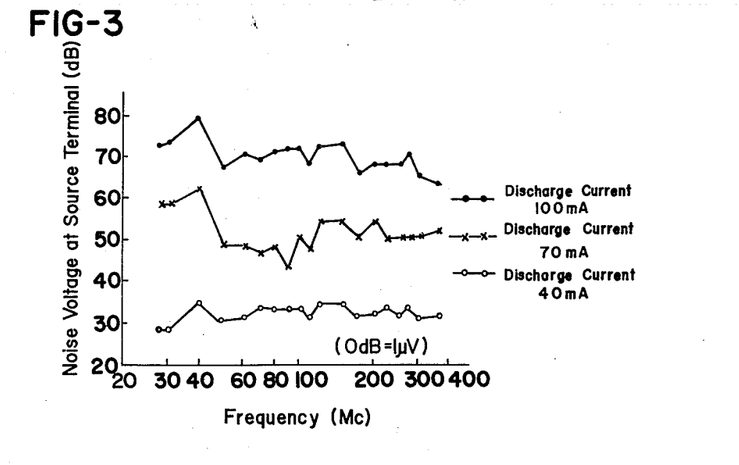
FIG. 3 shows the characteristic relation between random cathode noise voltage and the frequency.

FIG. 2 is a schematic sectional view showing the electrode portion of the tube when the random cathode noise RN is being generated. FIG. 2 shows a glass tube 1, an electrode 2 having a conical construction, and a pair of lead wires 3 and 3'. FIG. 3 shows the frequency character of the random cathode noise voltage of a conventional type neon lamp. In FIG. 3, three curves are shown which correspond to discharge currents of 100 ma., 70 ma. and 40 ma., respectively. This kind of noise, having the random wave form RN shown in FIG. 1, is generated by a condition of overflow of negative glow G from inside of the conical or tubular electrode 2, as shown in FIG. 2. The frequency distribution of this noise voltage shows a substantially flat character over a wide range of the frequency band.

Figure 4:
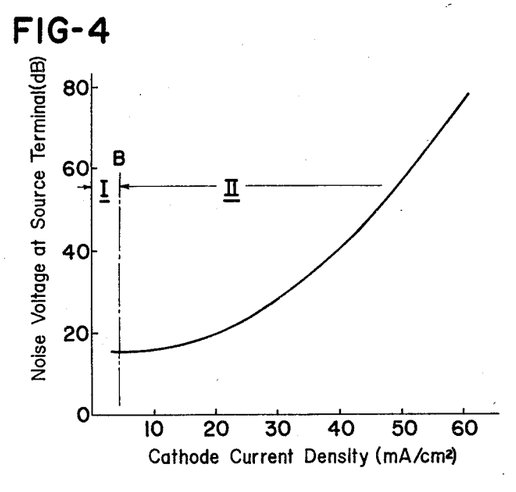
FIG. 4 shows a curve illustrating the characteristic relation between the cathode current density and the cathode noise voltage.

This noise voltage has a tendency to increase according to the increase of the discharge current, as shown in FIG. 4. FIG. 4 shows the relation between cathode current density and noise voltage at the source terminal.

Referring to FIG. 4, the discharging condition is the normal glow type in the range I, and of an abnormal glow type in the range II. The line B expresses a value of the density of cathode current at the transition point between a normal glow condition and an abnormal glow condition.

Figure 5:
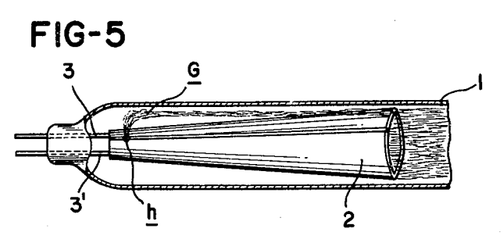
FIG. 5 shows a schematic section of the electrode portion of a neon lamp of the conventional type when periodic cathode noise is produced.

FIG. 5 is a schematic section showing the electrode portion of a conventional neon lamp when periodic noise, having the wave form P shown in FIG. 1, is being produced. In this figure, reference numerals 1, 2, 3 and 3' correspond to the elements explained in connection with FIG. 2.

Figure 6:
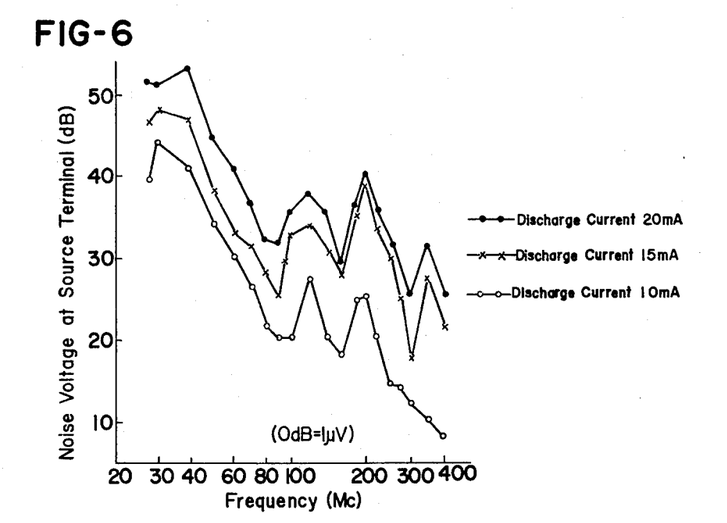
FIG. 6 shows the characteristic relation between periodic cathode noise voltage and the frequency.

FIG. 6 shows three curves of the frequency character of periodic cathode noise voltage at three discharge current values, 20 ma., 15 ma. and 10 ma. respectively. This kind of noise is produced by the blowing out of concentrated negative glow G when a pin hole $h$ or a crack exists in a side portion of the electrode 2, as shown in FIG. 5. In the aforementioned condition, a sinusoidal damping oscillation may appear intermittently. This kind of periodic noise also has the tendency to increase the voltage according to an increase of discharge current, but there are upper and lower limits to the value of the discharge current which will generate this kind of periodic noise.

Figure 7:
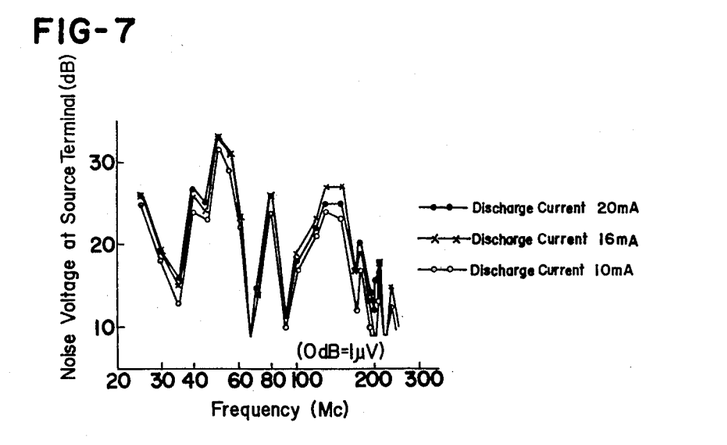
FIG. 7 shows an example of the frequency characteristics of anode noise voltage produced at the time of transient oscillation of the source voltage.

FIG. 7 shows the frequency character of anode noise voltage, having the wave form A in FIG. 1, which is generated at the time of transient oscillation of the source voltage. The diagram shows three curves corresponding to 20 ma., 16 ma. and 10 ma. respectively.

Figure 8:
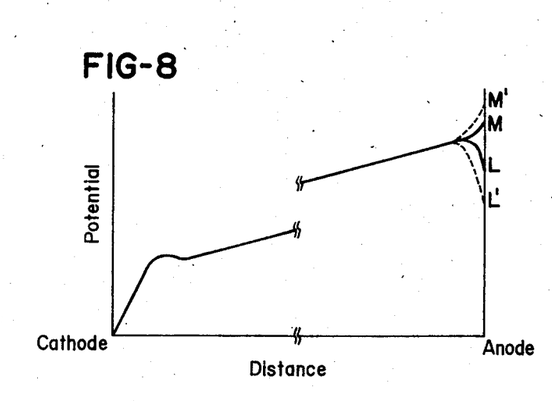
FIG. 8 is a diagram illustrating the cause of generation of anode noise.

FIG. 8 is a diagram illustrating the cause of the generation of the anode noise.

Generally a neon discharge tube is operated in a discharge condition by A.C. current. Under such a condition, at the time of reignition or starting of the discharge current at the beginning of each half cycle, an abrupt discharging current may flow through the tube, therefore, the source voltage decreases abruptly at the time of the each reignition. At this time an oscillating discharge current will flow through the tube owing to inductance, distribution capacity and stray ground capacity of the winding of the source transformer and stray ground capacity of the valve. This transient current may produce a high voltage having a sharp saw-tooth wave form between the cathode and anode electrodes. Since this current is carried by electrons, the influence of the oscillation appears strongly at the anode portion, therefore, anode noise having wave form A, in FIG. 1, is generated at the corresponding electrode.

As described above, the cause of generation of noises from a neon discharge tube is mainly classified into the above three causes of generation of the various noises. The various kinds of noises may vary in value and in relation, but usually some portion of any or all of them are produced from the discharge tube and make a disturbing effect for radio propagation.

The present invention is mainly concerned with an electrode construction of a cold cathode discharge tube which is able to suppress the generation of the aforementioned various noises and which is especially suitable for use as an electrode of neon discharge tubes.

The present invention has a main electrode having a conical or cylindrical form which is substantially closed except for the discharge opening. An additional electrode is provided inside of the main electrode. The additional electrode is formed as a tubular, conical or plate shape in order to effectively increase the surface area of operation of the cathode for making the operational discharge as a normal glow condition to prevent generation of random and periodic noises when the electrode is operating as the cathode of a discharge tube.

The present invention provides a round edge portion at the end of the main electrode facing the discharge space, wherein the radius of curvature of the outer circumference of this portion is at least 0.3 mm. in order to also suppress the generation of anode noise.

Figure 9:
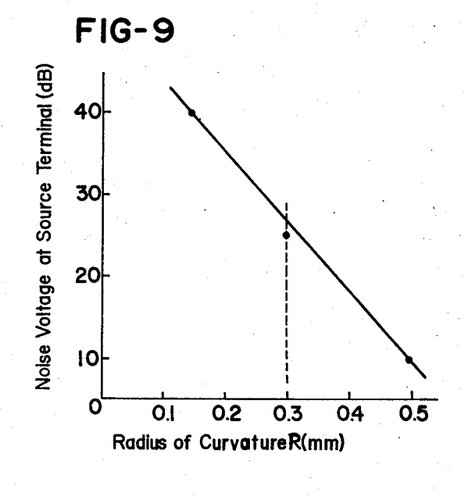
FIG. 9 shows the relation between anode noise voltage and radius of curvature of the cross section of a tubular shaped electrode body facing the discharging space.
Figure 10A:
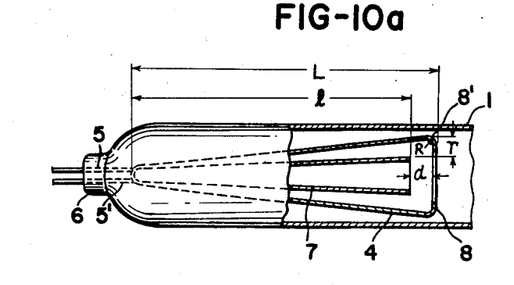
Figure 10B:
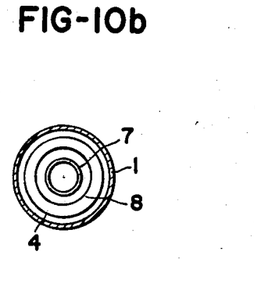

Referring to FIGS. 10a and 10b, the relation between the radius of curvature R at the portion 8' of main electrode 4, facing the discharge space, and the intensity of the noise voltage is shown in FIG. 9. As shown in FIG. 9, in the range of R exceeding a value R=0.4 mm. the intensity of the noise may decrease below the sensitive range of an electric field type noise meter and be regarded as substantially no noise.

For practical purposes, if we select the radius of curvature R to be at least 0.3 mm., the generation of this kind of noise can be decreased to a value of practically no influence for the outer portion.

The construction of the electrode according to the invention will be described with reference to FIGS. 10a and 10b to 15a and 15b.

FIG. 10a is a longitudinal section of a neon discharge tube according to the invention showing the electrode construction by partially removing the glass envelope. FIG. 10b is a transverse section through the same tube showing an end view of the inventive electrode. The glass envelope 1 is an elongated length of tube. A conical shaped main electrode 4, having the same outer configuration with that of a conventional neon discharge tube electrode, but perfectly closed along the side surfaces and the bottom portion, is mounted within the envelope. Lead wires 5 and 5' pass through the supporting portion 6 and are connected to the electrode 4. A conical additional electrode 7 is mounted inside of the main electrode 4.

As shown in the figure, the main electrode 4 has a length L which is larger than the length $l$ of additional electrode 7. At the opening end portion of the main electrode 4, facing the discharging space, an inwardly directed rim 8 is provided to make a round edge corner 8'. The dimension of both electrodes should be selected in accordance with the following conditions.

$$l+r \leq L$$
$$2\lambda > r > \lambda$$

wherein:

$r$ equals a distance between the peripheries of the main electrode and that of the conical additional electrode, as shown in the figure; and $\lambda$ equals the mean free path of a charged particle (electron).

The total length $l$ of the additional conical electrode 7 must be shielded by the total length L of main electrode 4. Both of the electrodes 4 and 7 are connected electrically with each other, for instance, by welding.

By forming the electrode of a cold cathode discharge tube as described above, the usual random noise and periodic noise generated during the cathode operation may be sufficiently suppressed.

In this embodiment of the invention, an inwardly directed ring shaped rim portion 8 is formed at the end of main electrode 4 by press working to form a round corner 8'. This rim portion 8' may have a radius of curvature R of at least 0.3 mm. at the corner of the joint between ring 8 and main electrode 4.

This rim portion 8' is effective to suppress anode noise produced by the oscillation of the transient voltage vibration of the source transformer.

The inventive electrode thus comprises a main electrode which is perfectly closed along the side surfaces and the bottom thereof, and an additional electrode provided inside the main electrode. The distance $d$ between the end portion of the additional electrode and opening surface of the main electrode is selected to be at least the distance of the mean free path of a charged particle.

Various other embodiments of the invention will be described hereinafter with reference to FIGS. 11a and 11b to 15a and 15b. All of the embodiments have the aforementioned basic construction with the inwardly directed rim construction at the opening end of the main electrode. However the invention covers all embodiments having the basic construction, as described above, without the rounded corner portion of the main electrode.

Figure 11A:
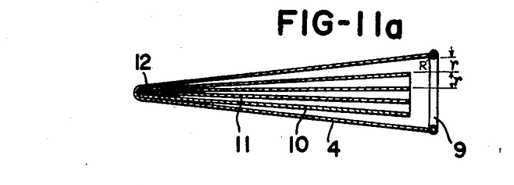
FIGS. 11(a) and (b) to FIGS. 15(a) and (b) show various alternate embodiments of the inventive electrode construction in partial longitudinal and transverse section views, respectively.
Figure 11B:
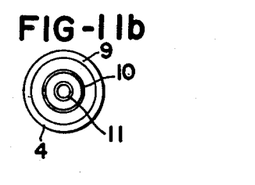

FIGS. 11a and 11b show an embodiment of the inventive electrode comprising conical main electrode 4 having connected thereto a ring shape electrode 9 with radius of curvature R of at least 0.3 mm. Inside of the main electrode 4, double concentric conical additional electrodes 10 and 11 are provided. The electrodes 4, 10 and 11 are fixed at the bottom portion 12 and connected electrically.

Figure 12A:
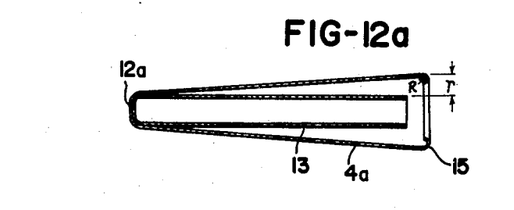
Figure 12B:
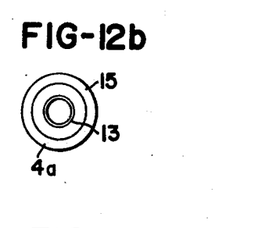

FIGS. 12a and 12b show an embodiment of the inventive electrode having an inwardly directed rim portion 15 at the end portion of main electrode 4a with a radius of the curvature of at lease 0.3 mm. Inside of the truncated conical main electrode 4a, a tubular shape additional electrode 13 is provided and secured to the main electrode at the bottom portion 12a.

Figure 13A:
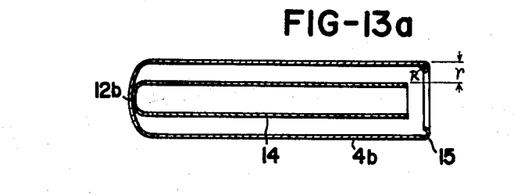
Figure 13B:
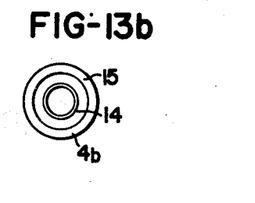

FIGS. 13a and 13b show an embodiment of the inventive electrode having the inwardly directed rim portion 15, having the radius R of at least 0.3 mm., at the end portion of substantially cylindrical main electrode 4b. An additional tubular shape electrode 14 is provided concentrically inside the electrode 4b and is secured at bottom portion 12b to the main electrode 4b.

In all of embodiments shown in FIGS. 11a and 11b to 13a and 13b, the side surfaces of the main electrode 4 should be a perfectly closed construction without any cracks or pin holes in the surface. The relative position of the main electrode and the additional electrode should satisfy the basic conditions as explained with reference to FIG. 10. The function and effect of all of these embodiments are substantially same with that of FIG. 10 and will be described in more detail hereinafter.

Figures 14A, 14B:
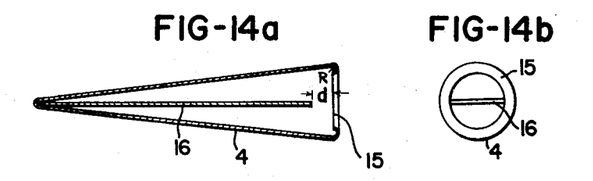

FIGS. 14a and 14b show another embodiment of the invention in which a plate shaped additional electrode 16 is provided at the inside of conical main electrode 4. Both edge portions of the plate shaped additional electrode 16 and the bottom portion thereof are in contact with the wall surface of main electrode 4.

Figures 15A, 15B:
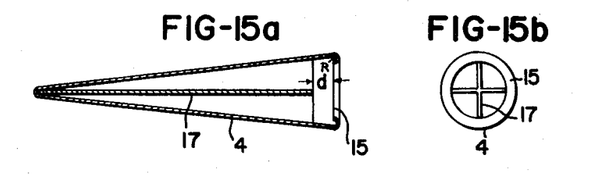

FIGS. 15a and 15b show a still further embodiment using a cross shaped, plate additional electrode. Both of the embodiments shown in FIGS. 14a and 14b and 15a and 15b are intended to meet the requirement of easy manufacturing. Both of these embodiments are provided with inwardly directed rim portions 15 at the opening end surface of the main electrode 4. The side surface of the main electrode 4 should be perfectly closed without any cracks or pin holes. Also the distance $d$ between center point of the opening of main electrode 4 and the center portion of the end of the additional electrodes 16 and 17, is selected to be at least the distance $\lambda$ corresponding to the mean free path of an electron.

An electron radiating substance may be applied onto the operational surface of the discharge elecrode according to the electrode construction of the invention. The application of the substance may be effected by any known manner. Such an electrode may increase the effective use as an electrode for a discharge tube. All of such electrodes are also covered by the present invention.

The function and effect of the invention will be described with reference to aforementioned embodiments of the electrode construction.

Generally, an electrode of a conventional neon discharge tube has a simple construction of a single conical or tubular shape in order to stabilize the condition of the cathode discharge and to obtain a hollow cathode effect. Accordingly, in such an electrode, negative glow is formed in the inside of the conical or tubular shaped electrode and the condition of discharge is considered as a normal glow discharge. Also in such a tube, the tube valve is usually constructed as an elongated shape in order to increase luminant efficiency. The size of the electrode is limited by the shape of the valve. Accordingly, a tube having a conventional electrode is operated during a period of low current during A.C. discharging, the cathode current density is kept to a small value and the discharge condition is a normal discharge glow.

However during the period of increase of the cathode current density, according to the increase of discharging current, the discharging condition of such tube may go from a normal glow condition to an abnormal glow condition.

As a result of experiments, the effective cathods current density at the time of transition from normal glow discharge to an abnormal glow discharge is as shown in line B in FIG. 4 and as a value of 4 ma./cm.² As shown in FIG. 4, if the cathode current density is increased over this value, the random cathode noise voltage will increase accordingly.

When such a conventionl discharge tube is operated in practical use, the current density at the peak value of discharge current is about 5 ma.–15 ma./cm.² Accordingly, the transition from normal glow discharge to an abnormal glow discharge condition is effected during each half cycle. In such a condition, the behavior of the discharge is as shown in FIG. 2 and the negative glow may overflow from the opening portion of the conical electrode 2. It is known that, in the condition of a low pressure discharge the discharge tends to start more easily according to an increase of the product between pressure P and discharge distance $l$ by Paschen's law. The neon discharge tube, having mercury vapor therein, may operate in the range of the above condition and at the condition of overflow of the negative glow from the electrode, the negative glow may arrive at the lead wire portion 3 and 3' along the side surface of the electrode. Under such condition, the transition is effected from a normal glow discharge condition to an abnormal glow discharge condition, therefore, the character of the discharge exhibits a negative resistance property.

In the discharge tube, having a conventional electrode construction, a random noise may be generated in the negative resistance range owing to a non-continuous variation of the discharge current. The manner of the variation of the discharge current depends on the diffusion of particles, recombination and loss of ions at the tube wall. The noise intensity is observed to be a high level when the negative glow reaches to the lead wire portion at the end of tube body. On the other hand, periodic cathode noise may be produced by a blow out of the negative glow concentrately from a pin hole or a crack which may exist in the side surface of the main electrode during the operation of the same. Such condition is shown in FIG. 5. Under such a condition, the concentrated negative glow passes through a limited portion, such as crack or pin hole, and passes electrons and ions therethrough in a high concentration. Therefore, the density of charged particles at such pin hole may decrease owing to the heat of the gas compared with the rest of the discharge tube. Therefore, the ratio $E/P$ between electric field E and pressure P, may increase at the concentrated portion. Therefore, the ionization and temperature may still increase and the concentration will increase accordingly. The periodic noise is considered to be generated by a mutual action of concentrated glow and plasma at the periphery thereof.

In order to eliminate the cause of generation of noise in a cold cathode discharge tube having an electrode construction of conventional type, the present invention provides a main electrode having a completely closed configuration along the side surfaces of the electrode except for the front opening thereof. Accordingly, any crack or pin hole is removed from the side surface of the main electrode, to thus prevent generation of a concentrated glow discharge such as shown in FIG. 5. For the manufacture of the main electrode of this invention, the electrode is formed by press working or by a welding process by sealing the joint portion. According to the invention, periodic noise is suppressed by the construction of the main electrode. Moreover, according to the electrode construction of the invention, inside of the main electrode of conical or tubular shape there is provided an additional electrode of conical shape, cylindrical shape or plate shape with both electrodes being electrically connected. Therefore, it is possible to increase the operational surface of the discharge and also to obtain a remarkable hollow cathode effect. By using the electrode of the invention, the cathode current density can easily be maintained at less than 4 ma./cm.² to thus effectively prevent random noise and a substantially noiseless neon discharge tube can be obtained.

Moreover, an electron emissive substance such as barium, strontium, calcium, magnesium, cerium and the like may be applied to the inner surface of the conical or tubular shaped main electrode and to the surface of the additional electrode in order to utilize the $\gamma$ effect of the substance. The $\gamma$ effect is a kind of secondary emission caused by corrosion of ions onto the surface. By this application of an emissive substance, the $\gamma$ function and also the hollow cathode effect may help the generation of the negative glow. The negative glow therefore can only exist at inside of conical or cylindrical electrode to thus prevent generation of random noise.

In another aspect of the invention, anode noise caused by transient oscillation of the source transformer can also be prevented along with the cathode noise. As explained before, the transient oscillation is caused by inductance, stray capacity and stray ground capacity of the power transformer and also by stray ground capacity of the tube. The basic frequency of the transient oscillation distributes over a range of several 100 kc. The wave form of the transient oscillation, remarkably distorted, and the voltage of the oscillation is very high, which voltage is a value sufficiently high to energize a number of serially connected neon discharge tubes. This peak value of transient oscillation voltage may arrive at over 4,000 v. in the conventional neon discharge tube. According to the transient voltage, an oscillatory discharge current may flow in the tube, but the current in the discharge tube is carried by electrons, therefore the influence of the oscillatory current may appear strongly at the anode portion of the tube, when compared with the cathode portion of the tube. Accordingly, the anode noise is generated from the tube under such condition.

Generally, when an electrode of a neon discharge tube is operating as an anode, the end portion of the electrode facing the discharging space may effectively operate as an anode of the tube and local anode glow is formed at this point.

By this effect, the charged particles are concentrately distributed in front of the anode electrode and the anode drop may remarkably vary according to the variation of discharging current, as shown by dotted lines of M' and L' of FIG. 8. Such variation may cause anode noise and also act to help the aforementioned transient oscillation.

Accordingly, in order to prevent radio frequency noise caused by transient voltage oscillation of the source transformer, it is necessary to prevent the generation of the anode noise. For this purpose it is necessary to prevent the concentration of anode glow. Namely, for preventing generation of anode noise, it is necessary to increase the operational surface of the anode and also to prevent local concentration of the potential distribution.

For such purpose, the electrode of the embodiments of the invention are provided with a round edge of which the radius of curvature R is at least 0.3 mm. at the cross section, as shown by the notation 8', 9 or 15 in the drawings of FIGS. 10a and 10b to 15a and 15b. By making such configuration of the end of the electrode, the charged particles at the front of the anode may be evenly distributed, therefore, anode glow is formed over a wide surface. Therefore, the variation of the anode drop can be decreased, as shown by the full lines M and L in FIG. 8. Moreover, by this configuration of electrode, the density of charged particles at the portion of anode drop may also decrease. This causes an increase of the impedance of the discharging space of said portion and the aforementioned transient oscillation is strongly damped by this impedance. Accordingly the electrode of the invention can prevent the transient oscillation of the source voltage itself and the anode noise which is caused by the transient oscillation.

Figure 16:
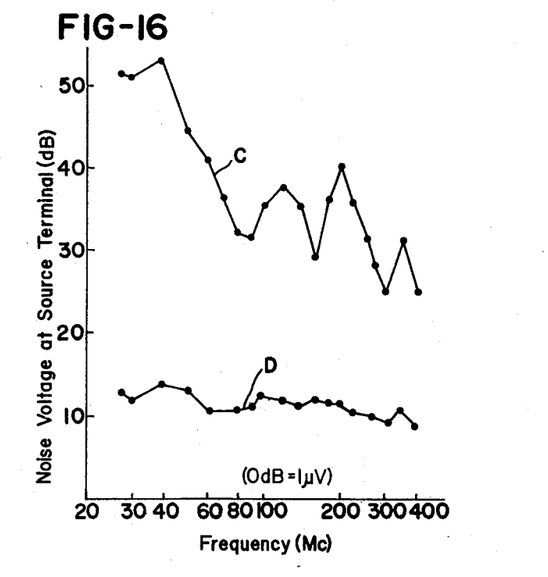
FIG. 16 shows frequency characteristic curves of noise voltage at the source terminal of neon lamps comparing an embodiment of the invention with a conventional neon lamp.

FIG. 16 is a diagram showing the frequency characters of noise voltage at the source terminal of a neon discharge tube in comparison of an electrode construction according to the invention and that of the conventional type. The curve C shows variation of noise voltage of the tube using a conventional electrode. The curve D shows the character of the noise voltage of the tube using an electrode according to the invention. The character of the electrode of the invention corresponds to embodiment shown in FIG. 10, wherein no emissive substance is applied to the inner wall surface of the electrode. As apparent from a comparison of the curves C and D, the noise suppression effect of the electrode of the invention is very remarkable. The inventive electrode can suppress the mean noise voltage intensity to less than 15 db. The electrode of the invention has a very simple construction and is very easy to manufacture without a substantial increase of manufacturing cost. Therefore, the present invention affords a great advantage for the prevention of the emission of high frequency noise. Moreover, in the construction of the inventive electrode, the main electrode and the additional electrode are spaced apart at least a distance corresponding to the mean free path of charged particles at the opening portion of the electrode. Therefore, an excellent hollow cathode effect can be obtained. Accordingly, if the inventive electrode construction is used in the discharge tube, it is possible to maintain a continuous stable discharge with a remarkable improvement of the stability and efficiency when compared with a conventional discharge tube.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description, and all changes which come within the meaning and range of equivalency of the claims are therefore to be embraced therein.

What is claimed is:

1. An electrode for a cold cathode discharge tube comprising a hollow main electrode having a substantially closed construction with a single opening at one end thereof to produce an electron flow in the longitudinal direction of said tube, and an additional electrode mounted within the main electrode to form a partition in the direction of the opening of the main electrode, both said main and said additional electrodes being connected electrically, wherein said opening end of the main electrode and the end portion of the additional electrode facing said opening of the main electrode are spaced apart in the axial direction a distance at least equal to a mean free path of a charged particle.

2. An electrode for a cold cathode discharge tube as claimed in claim 1, wherein an inwardly directed rim having a radius of curvature of the outer circumferential surface of at least 0.3 mm. is provided at said opening end of said main electrode.

3. An electrode for a cold cathode discharge tube as claimed in claim 1, wherein the inner wall surface of the main electrode and the surface of said additional electrode have a thin film of an electro-emissive substance applied thereto.

4. An electrode for a cold cathode discharge tube as claimed in claim 1, in which said main electrode and said additional electrode are concentrically mounted in spaced relation, the axial distance between the end portion of the additional electrode facing the opening of the main electrode and the end portion of main electrode being at least equal to the distance corresponding to a mean free path of a charged particle.

5. An electrode for a cold cathode discharge tube as claimed in claim 4, wherein the end portion of said main electrode facing the discharge direction has an inwardly directed rounded rim with a radius of curvature of the outer circumferential cross section being at least 0.3 mm.

6. An electrode for a cold cathode discharge tube as claimed in claim 1, wherein the additional electrode is formed by flat conductive plate, the end portion of the additional electrode facing the opening of the main electrode being spaced apart from said opening in the direction of the opening at least a distance corresponding to a mean free path of a charged particle.

7. An electrode for a cold cathode discharge tube as claimed in claim 6, wherein the main electrode is provided at the opening end with an inwardly directed rim portion having a radius of curvature of the outer circumference cross section of at least 0.3 mm.

8. An electrode for a cold cathode discharge tube as claimed in claim 1, wherein the opening end of the main electrode is provided with an inwardly directed rim having a radius of curvature of the outer circumference cross section of at least 0.3 mm.

9. An electrode for a cold cathode discharge tube as claimed in claim 8, wherein the inner wall surface of the main electrode and the surface of the additional electrode have a thin film of electro-emissive substance applied thereto.

10. An electrode for a cold cathode discharge tube as claimed in claim 1, wherein said main electrode is conical.

11. An electrode for a cold cathode discharge tube as claimed in claim 10 wherein said additional electrode is conical, the apex of both said electrodes being joined together.

12. An electrode for a cold cathode discharge tube as claimed in claim 10 wherein said additional electrode is plate shaped with the sides thereof joining said main electrode.

13. An electrode for a cold cathode discharge tube as claimed in claim 10 wherein said additional electrode is cross shaped with the sides thereof joining said main electrode.

14. An electrode for a cold cathode discharge tube as claimed in claim 1 wherein said main electrode is substantially cylindrical.

15. An electrode for a cold cathode discharge tube as claimed in claim 14 wherein said additional electrode is substantially cylindrical.

16. An electrode for a cold cathode discharge tube as claimed in claim 10 wherein said additional electrode is a double concentric conical electrode.

References Cited

UNITED STATES PATENTS

| | | | |
|---|---|---|---|
| 957,983 | 5/1910 | Moore | 313—356 X |
| 1,891,475 | 12/1932 | Hotchner | 313—217 X |
| 2,006,081 | 6/1935 | Anderson et al. | 313—217 X |
| 2,012,237 | 8/1935 | Beck | 313—346 |
| 2,035,623 | 3/1936 | Sukumlyn | 313—69 |
| 2,117,054 | 5/1938 | Boucher | 313—205 |
| 2,246,486 | 6/1941 | Blackburn | 313—356 X |
| 2,512,835 | 6/1950 | Millimaki et al. | 313—195 X |

JAMES W. LAWRENCE, Primary Examiner

D. O'REILLY, Assistant Examiner

U.S. Cl. X.R.

313—209, 214, 217, 356